UNITED STATES PATENT OFFICE.

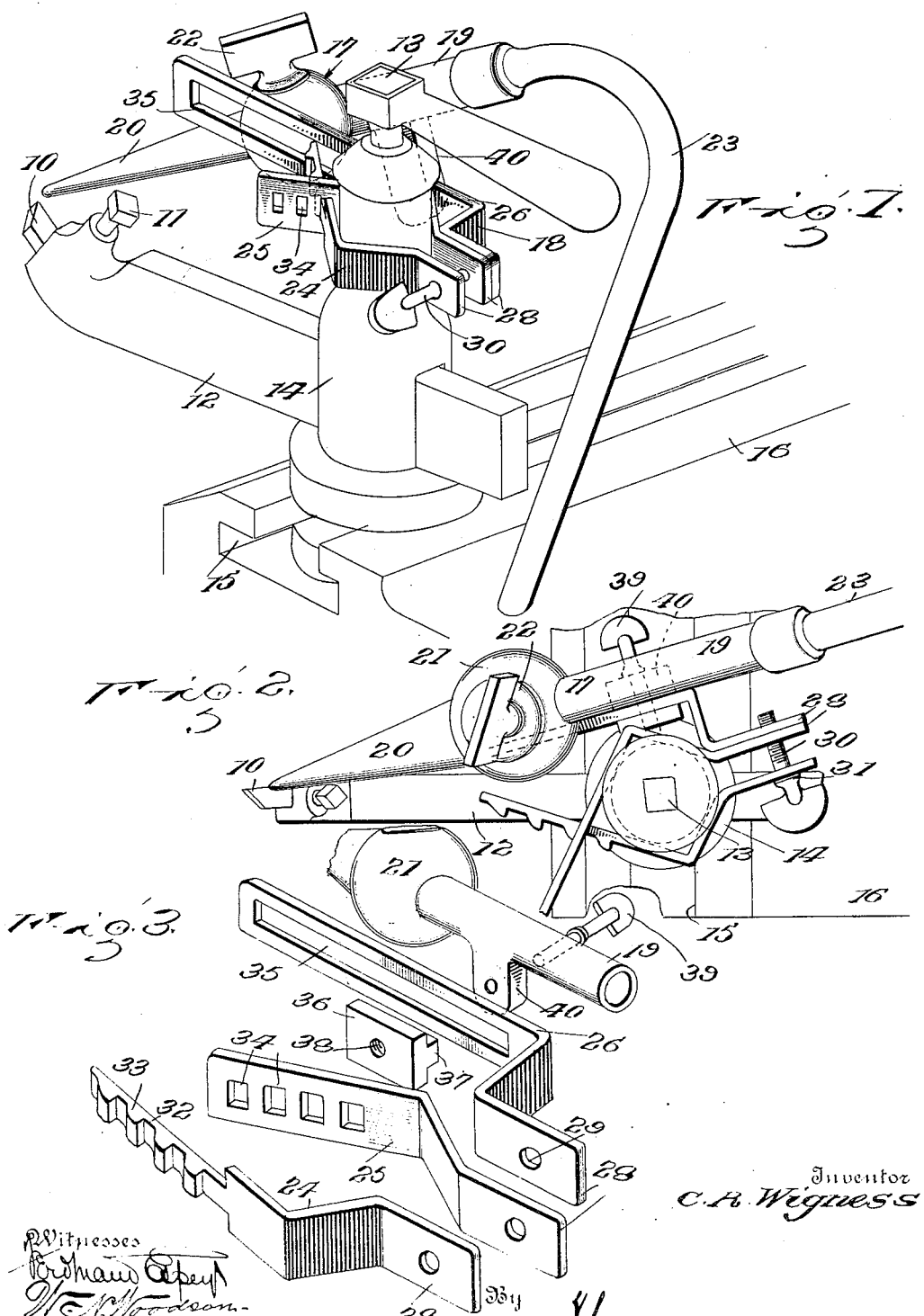

CORNELIUS R. WIGNESS, OF HARLAN, IOWA.

COOLING APPARATUS FOR METAL-WORKING TOOLS.

1,119,669.  Specification of Letters Patent.  Patented Dec. 1, 1914.

Application filed December 11, 1912. Serial No. 736,105.

*To all whom it may concern:*

Be it known that I, CORNELIUS R. WIGNESS, subject of the King of Norway, residing at Harlan, in the county of Shelby and State of Iowa, have invented certain new and useful Improvements in Cooling Apparatus for Metal-Working Tools, of which the following is a specification.

This invention relates to new and useful attachments for metal working tools and particularly for tools employed in connection with metal working lathes and the object of my invention is to provide an apparatus which may be attached to the tool post of the lathe and which will keep the tool cool during use.

A further object of my invention is to provide an air discharging nozzle which may be adjustably mounted upon the tool post in position to discharge a blast of air against the point of the tool, and means for supplying air to the nozzle. And a still further object of my invention is to provide a compound clamp for mounting the nozzle in place upon the tool post and holding the same in adjusted position, this clamp being adjustable for various sizes and styles of posts and also being so arranged that the nozzle may be advanced or retracted and also adjusted angularly.

With these and other objects in view, my invention will be more fully described, illustrated in the accompanying drawings, and then specifically pointed out in the claims which are attached to and form a part of this application.

In the drawings: Figure 1 is a fragmentary perspective view of the table of a metal working lathe, showing a tool post in place with a tool mounted in the post and my improved apparatus adjusted thereon in position to discharge a blast of air against the tool; Fig. 2 is a top plan view of the apparatus shown in Fig. 1; Fig. 3 is a perspective view of the various parts of my apparatus in unassembled position.

Corresponding and like parts are referred to in the following description and indicated in all the views of the drawings by the same reference characters.

For the sake of clearness I have illustrated my apparatus in use in connection with a common form of metal working tool 10 adjustably mounted by a set screw 11 in a tool holder 12 of conventional type. This tool holder is in turn adjustably mounted by means of a set screw 13 in a tool post 14 which is in turn mounted in the usual undercut channel 15 of the lathe table 16.

My improved apparatus consists primarily of an air discharging nozzle, indicated as a whole by the numeral 17 and a compound clamp 18 for adjustably mounting the nozzle in proper position upon the tool post 14. This nozzle may be of common or any preferred type and as illustrated in the drawings includes a body or shank portion 19 and a contracted discharge terminal 20 connected by an integrally formed valve casing 21 having a valve 22 of the turn plug type by means of which the supply of air through the nozzle may be regulated. In use, this nozzle is adjustably mounted upon the tool post, as shown in Fig. 1 of the drawings, and operatively connected by a flexible hose or other suitable coupling 23 with a blower, compressed air tank or other suitable source of air supply, not shown.

In order to adjustably mount the nozzle upon tool posts of various sizes and shapes, I have provided the compound clamp previously designated by the numeral 18. This clamp includes a plurality of substantially L-shaped co-acting clamp plates 24, 25 and 26, preferably formed of resilient metal and each provided at one end with an angularly disposed, perforated ear 28, the perforation of the ear of the clamp plate 26 being internally threaded, as shown at 29 for threaded engagement by a winged clamp screw 30 which, in application of the clamp, is passed through the perforations of the ears of the clamp members 24 and 25 and threaded through the perforation 29 of the clamp member 26 to bind the ears together as shown in Figs. 1 and 2 of the drawings, the shank of said set screw being provided with a shoulder 31 which engages against the outer face of the ear 28 of the clamp plate 24, the real clamping action being therefore exerted between the ears of the plates 24 and 26.

The opposite end portion of the clamp plate 24 is reduced to form an extended tongue 32, the outer face of which is provided with a plurality of outwardly directed teeth 33, the rear faces of which are vertical, while the forward faces are inclined toward the free end of the tongue, as best shown in Figs. 2 and 3 of the drawings.

The free end portion of the clamp plate 25 is provided with a plurality of spaced apart squared apertures 34 through which the tongue 32 may be passed and it will be apparent that when said tongue is passed through one of these apertures and the ears of the clamp plates 24 and 25 swung toward each other to bind the angular portions of the clamp plates against opposite sides of the tool post, one of the teeth 33 will engage against the outer face of the clamp plate 25 to prevent disengagement of the plates and permit the same to be clamped tightly about the post. By providing a plurality of teeth 33 and a plurality of spaced openings 34, the clamp plates 24 and 25 may be employed on practically any style or size of tool post with equal facility.

The free end portion of the clamp plate 26 is provided with a longitudinally disposed rectangular slot 35, the side walls of which are parallel and a nut 36 is provided with a longitudinally extending shoulder 37 upon its inner face adapted for movement in this slot. This nut is provided with a tapped bore 38 for threaded engagement with a set screw 39 of the same type as the set screw 30 previously described.

The body portion 19 of the nozzle is provided with a downwardly depending perforated lug 40 through which the shank of the set screw 39 is passed before it enters the nut 36. It will therefore be apparent that by first loosening and then tightening this set screw 39, the nozzle and nut may be moved to any portion of the slot 36 and the nozzle swung at any desired angle to the clamp member 26 and locked in adjusted position.

In applying my improved apparatus, the free end of the tongue 32 is passed through one of the slots 34 of the clamp plate 25 as previously described and the angularly disposed portions of the clamp plates 24 and 25 positioned to bear against opposite sides of the tool post with their ears 28 spaced apart as shown in Fig. 2 of the drawings. The ear 28 of the clamp plate 26 is then positioned against the ear of the clamp plate 25 and the set screw 30 passed through the ears of the plates 24 and 25 and threaded through the threaded perforation 29 of the clamp plate 26 to lock the clamp plates 24 and 25 about the tool post and to bind the clamp plate 26 in place.

The clamp plate 26 preferably coincides throughout a slight portion of its length with the clamp plate 25 in such a manner that when clamped in place, it will be held against all swinging movement about the set screw. The nut 36 is then positioned with its shoulder 37 extending into the slot 35 from the inner side of the clamp plate 26 and the perforated lug 40 of the nozzle is positioned against the outer face of the plate 26 with its perforation in alinement with the tapped bore of the nut. The set screw 39 is then applied to secure the nozzle in place in the manner previously described.

From the foregoing description it will be apparent that an air discharging nozzle of the type shown may be readily and quickly attached to or detached from any conventional form of tool post and may be moved to any required adjusted position by the manipulation of a single set screw when the clamp is once in place. The nozzle is preferably adjusted in such a manner that its discharge end is spaced but a slight distance from the working edge of the tool in order to apply the air blast in the most effective manner.

It will of course be understood that minor changes in details of construction may be made, if desired, without in the slightest degree departing from the spirit of my invention. It will further be understood that the use of the air nozzle is not restricted to metal working lathes as it may be applied with equal facility to shapers, milling machines, boring mills, planers, and all kinds of machine tools and all kinds of tool grinding machines, in fact wherever a cooling blast of air can be applied to prevent overheating of the tempered metal.

Having thus described the invention, what is claimed as new is:

1. An apparatus of the character described including a plurality of clamp members, a set screw co-acting with said members to clamp the same to each other and about a support, one of said members being provided with a slot, a nut having a shoulder passing into the slot, an air nozzle having a perforated lug, and a set screw passed through the lug and slot and threaded into the nut.

2. An apparatus of the character described including a clamp plate provided at one end with an angularly disposed perforated ear and at its other end with a toothed tongue, a second clamp plate provided at one end with an angularly disposed ear co-acting with the ear of the first and at its other end with a plurality of spaced openings adapted to receive the tongue of the first plate, and a third clamp plate provided with an ear having a threaded perforation and provided at its free end with a slot, a set screw passed through the perforated ears of the first and second clamp plates and threaded through the perforation of the third clamp plate, and an air nozzle adjustably mounted upon the slotted end of the third clamp plate.

3. An apparatus of the character described including an adjustable clamp adapted for engagement with a tool post, a bracket carried by the clamp, and an air supply nozzle carried by the bracket, its attachment to the bracket permitting angular adjustment in a vertical plane.

4. An apparatus of the character described including an adjustable clamp, a slotted bracket carried by the clamp, and an air supply nozzle carried by the bracket and adjustable longitudinally of the slot.

5. An apparatus of the character described including a bracket provided with a slot, means for securing the bracket to a tool post, a nut having a shoulder slidable in the slot, an air nozzle having a perforated lug, and a set screw passed through the lug and slot and threaded into the nut.

6. An apparatus of the character described including a plurality of L-shaped clamp members, a bracket, a set screw coacting with said members and bracket to clamp the members about a support and the bracket to the members, and an air nozzle carried by the bracket.

In testimony whereof I affix my signature in presence of two witnesses.

CORNELIUS R. WIGNESS. [L. S.]

Witnesses:
   Louis M. Kerr,
   Arley V. Parker.